United States Patent [19]

Takano

[11] 4,266,937
[45] May 12, 1981

[54] ADJUSTLESS V-BELT AND METHOD OF MANUFACTURE

[75] Inventor: Hiroshi Takano, Miki, Japan

[73] Assignee: Mitsuboshi Belting Ltd., Kobe, Japan

[21] Appl. No.: 31,799

[22] Filed: Apr. 20, 1979

[30] Foreign Application Priority Data

Apr. 26, 1978 [JP] Japan ................... 53-50671

[51] Int. Cl.³ .................. F16G 5/16; F16G 1/26; B29H 7/22
[52] U.S. Cl. ........................ 474/205; 156/138; 156/139; 156/140; 156/141; 474/260; 474/263; 474/267
[58] Field of Search .............. 74/233, 234, 231 C; 156/138, 139, 140, 141; 474/204, 205, 263, 264, 265, 266, 267

[56] References Cited

U.S. PATENT DOCUMENTS

| | | | |
|---|---|---|---|
| 3,473,989 | 10/1969 | Richmond | 74/233 |
| 3,656,360 | 4/1972 | Fix | 74/234 |
| 3,738,188 | 6/1973 | Ray | 156/138 |
| 3,830,113 | 8/1974 | Bruns | 74/233 |
| 3,995,507 | 12/1976 | White et al. | 74/233 |
| 4,024,773 | 5/1977 | Hartman et al. | 74/233 |
| 4,027,545 | 6/1977 | White, Jr. | 74/233 |
| 4,083,261 | 4/1978 | Speer et al. | 74/233 |

*Primary Examiner*—William R. Dixon, Jr.

*Attorney, Agent, or Firm*—Sughrue, Rothwell, Mion, Zinn and Macpeak

[57] ABSTRACT

An adjustless V-belt and method of manufacture. The V-belt comprises: a compressive rubber layer made of a heatproof or coldproof rubber and an adhesion rubber layer laminated on said compressive rubber layer. A group of cogs protrude from said adhesion rubber layer with a predetermined pitch and depth and a longitudinally stretchable cover canvas covers the cogs, and the roots between said cogs. Rope tensile members are embedded between the adhesion rubber layer and the group of cogs with a regular pitch line and in the cylindrical state such a manner that parts of the tensile members are in contact with said cover canvas. The rope tensile members have a high thermal contraction stress of at least 3.5 g/denier which is the differential between a thermal contraction stress at 100° C. and that at room temperature (about 20° C.). Short fibers are embedded in the compressive rubber layer in such a manner that the short fibers are orientated laterally therein. A ply of rubberized canvas is bonded, in lamination, to the lower surface of the compressive rubber layer. A reversal molding technique is used with the cover canvas first wound around a metal mold having protrusions and grooves followed by the rope tensile member, the adhesion rubber sheet, the compressive rubber sheet and finally the rubberized canvas. A cylindrical sleeve is placed over the belt blank thus formed and the assembly is pressurized and heated to permit a portion of the adhesion rubber to fill the grooves in the metal mold.

20 Claims, 13 Drawing Figures

ADJUSTLESS V-BELT AND METHOD OF MANUFACTURE

BACKGROUND OF THE INVENTION

This invention relates to an adjustless V-belt and a method of manufacturing the same, and more particularly to a power transmitting adjustless V-belt which automatically absorbs and adjusts its elongation resulting during operation, to thereby maintain the tension constant.

Wrapping connector driving belts such as flat belts, V-belts, and poly-V-belts serve, in general, to transmit power through the frictional force thereof. Accordinly, the belt needs a tension predetermined according to the driving conditions. If the belt is elongated and the tension is decreased during the run, then the force of the belt gripping the pulley is decreased. As a result, the belt slips. If the belt slips in this manner, then heat is generated in the belt, and the belt is therefore further elongated while the degree of slip of the belt is also further increased. Finally, the belt may be broken earlier than is normal service life by the heat generated therein. Accordingly, in order to improve the durability of the belt, it is necessary to provide a belt which is elongated to a negligable extent and can maintain a tension higher than a threshold value at which slip is caused.

Recently, a technical concept has been studied with interest in which a rope having a great thermal contraction stress, such as a synthetic fiber rope made of, for instance, polyester fibers, is used as the tensile member of a belt, so that, when heat is generated in the belt to elongate the latter, the tensile member reacts quickly with the generation of heat in the belt to contract the belt thereby to suppress the elongation of the belt. During a series of belt manufacturing processes, the thermal elongation treatment of the rope tensile member is extensively carried out in order to reduce the elongation of the rope tensile member before the belt molding process. However, as the degree of thermal elongation treatment for the synthetic fiber rope is increased, the thermal contraction stress is increased during vulcanization. Accordingly, when the synthetic fiber rope spirally wound on a cylindrical drum or a metal mold through a rubber layer not vulcanized yet is subjected to vulcanization, then the rope tensile member is contracted by the contraction stress. As a result, it is dropped in the rubber layer, and the contraction stress is reduced. Thus, the resultant belt is high in elongation. At worst, the rope tensile member in the rubber layer is disturbed, and it is difficult to maintain the pitch line of the rope tensile member regular.

The above-described drawbacks accompanying a conventional method of manufacturing a rubber V-belt or a V-belt with cogs, and secondary difficulties which are involved in counter-measures effected to eliminate the drawbacks will be described with reference to FIGS. 1 through 5.

As shown in FIG. 1 a few plys of rubberized canvas 24 are wound around a cylindrical metal method mold 21 or a metal mold (not shown) on the outer wall of which protrusions are formed. A compressive rubber sheet 22 and an adhesion rubber 23a, which are not vulcanized yet, are laminated on the rubberized canvas layer 24. Then, a rope tensile member 26 made of polyester fibers having a large thermal contraction stress is wound spirally on the adhesion rubber sheet 23a. Thereafter, an adhesion rubber 23b not yet vulcanized of several plys of rubberized canvas 25 are wound on the rope tensile member 26 in succession, to form an assembly. Then, the assembly is externally pressurized and heated to obtain a molded belt blank. Thereafter, the molded belt blank is cut into a plurality of rings to provide V-belts.

In this method of manufacturing V-belts, the rope tensile member 26 is embedded in the adhesion rubber layers 23b and 23a as the latter flow under the application of heat and pressure. However, the amount of rubber flowing between the parts of the rope tensile member spirally wound is very small, and the degree of friction obtained by the flow of rubber is therefore small. Thus, it is difficult to activate the surface of the rope tensile member 26. Also, various blending chemicals and softeners are mixed in the adhesion rubber layers 23b and 23a and are not yet vulcanized. Therefore, the surfaces of the adhesion rubber layers 23a and 23b are unsatisfactory in terms of adhesion property. Thus, in combination with the rope tensile member 26 having the inert surface, it becomes difficult to bond the rope tensile member to the adhesion rubber layers 23a and 23b.

Furthermore, since the rope tensile member 26 having the thermal contraction characteristic is wound on the flexible rubber layer not yet vulcanized, the rope tensile member is contracted during vulcanization. As a result, it is dropped as indicated by the arrows (FIG. 1) in the adhesion rubber layer 23a and the compressive rubber layer 22 below the rope tensile member. Thus, as shown in FIG. 2, the arrangement of the parts of the rope tensile member 26, i.e., the pitch line thereof becomes irregular. Accordingly, tension is non-uniformly applied to the parts of the rope tensile member 26, whereby the belt may fail prematurely.

In order to eliminate the above-described difficulty where the tensile member is dropped in the rubber layer by thermal contraction, a method may be employed in which, as shown in FIG. 3, a reinforcing canvas layer 28 is provided below the rope tensile member 26 to prevent the rope tensile member from dropping in the rubber layer. In this case, however, the rope tensile member 26 embedded in the adhesion rubber layer 23 is dropped in the lower part of the adhesion rubber layer 23, to be brought into contact with the reinforcing canvas 28. Therefore, the reinforcing canvas may separate the belt into layers.

FIG. 4 shows a reversal molding method. An upper rubberized canvas 25, an adhesion rubber layer 23, a rope tensile member 26, a compressive rubber layer 22 and a lower rubberized canvas 24 are wound on a metal mold 21 in succession to form an assembly. The assembly is pressurized and heated to provide a molded belt blank, and the molded belt blank is cut into a plurality of rings. These are turned inside out to provide the composite belt. In this conventional method also, it is difficult to prevent the rope tensile member from dropping into the rubber layer; that is, the rope tensile member 26 is caused to drop into the adhesion rubber layer 23 as indicated by the arrows. As a result, the rope tensile member 26 is brought into contact with the upper rubberized canvas layer 25 as shown in FIG. 5. Thus, in this case also, the above-described trouble may be caused with respect to the surface where the tensile member is provided.

As is apparent from the above description, in the above-described various methods, no rubber layer is provided between the tensile member and the reinforcing canvas or the upper rubberized canvas layer, i.e., the tensile member is in direction contact with the canvas, and therefore the adhesion property of the rope tensile member is lowered. Thus, the tensile member is liable to peel off during the run of the belt. Thus, the conventional methods described above are still disadvantageous in many respects.

SUMMARY OF THE INVENTION

Accordingly, an object of this invention is to eliminate all of the above-described difficulties accompanying a conventional rubber V-belt.

Another object of this invention is to provide for an improved belt having superior performance characteristics.

Still another object of this invention is to provide for a method of making rubberized V-belts that is economical and efficient.

According to this invention an adjustless V-belt comprises a compressive rubber layer made of a heatproof or coolproof synthetic rubber and an adhesion rubber layer laminated on the compressive rubber layer. A group of cogs protrude from the adhesion rubber layer and extend in the direction of width of the V-belt. The cogs have a predetermined depth and are arranged at a predetermined pitch. A stretchable cover canvas covers the cogs and the roots between the cogs. Rope tensile members are embedded between the adhesion rubber layer and the group of cogs with a regular pitch line in such a manner that the tensile members form a cylinder and parts of the tensile members are in contact with the cover canvas. The rope tensile members have a thermal contraction stress of at least 3.5 g/denier which is the differential between a thermal contraction stress at 100° C. and that at room temperature. Short fibers are embedded laterally in the compressive rubber layer and single or plural plys of rubberized canvas are laminated on the lower surface of the compression rubber layer.

In the method of manufacturing an adjustless V-belt according to this invention, the following steps are carried out:

(a) winding a cover canvas which is longitudinally stretchable around a metal mold having an outer wall with strip-shaped protrusions and grooves are alternately formed in such a manner that said protrusions and grooves extend along the axis of the metal mold;

(b) spirally winding a rope tensile member around the cover canvas, the rope tensile member being subjected to thermal elongation treatment and having a high thermal contraction stress of at least 3.5 g/denier which is the differential between a thermal contraction stress at 100° C. and that at 20° C.;

(c) winding an adhesion rubber sheet on the rope tensile member;

(d) winding a compressive rubber sheet in which short fibers are mixed in such a manner that the short fibers are orientated laterally therein, on the adhesion rubber sheet;

(e) winding at least one ply of rubberized canvas (bias or stretchable) to the compressive rubber sheet, to form molded belt blank;

(f) placing a cylindrical sleeve over the molded belt blank; and (g) pressurizing and heating the molded belt blank together with the cylindrical sleeve, to permit a part of the adhesion rubber sheet to fill the grooves of the metal mold.

An adjustless V-belt according to the invention will be described with reference to FIGS. 6 through 11.

DESCRIPTION OF THE PREFERRED EMBODIMENTS

Figure 1:
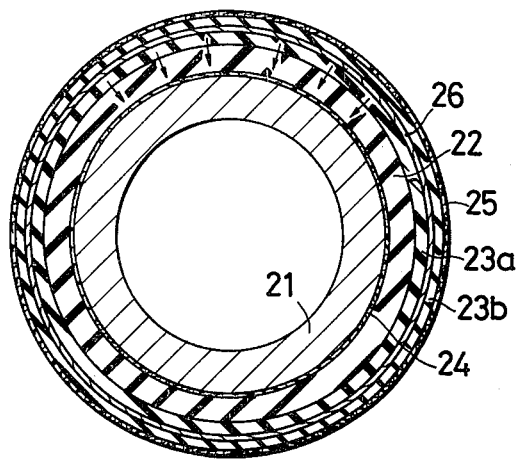
FIG. 1 is a sectional view of one conventional method of manufacturing a V-belt.
Figure 2:
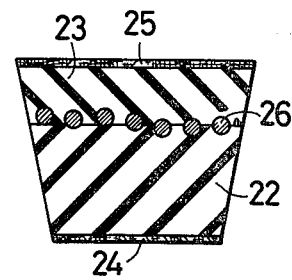
FIG. 2 is a sectional view of a V-belt manufactured according to the conventional method illustrated in FIG. 1.
Figure 3:
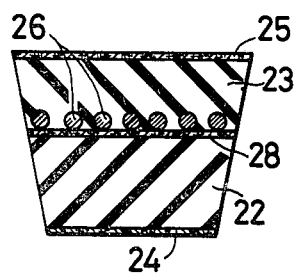
FIG. 3 is a sectional view showing a modification of the conventional V-belt.
Figure 4:
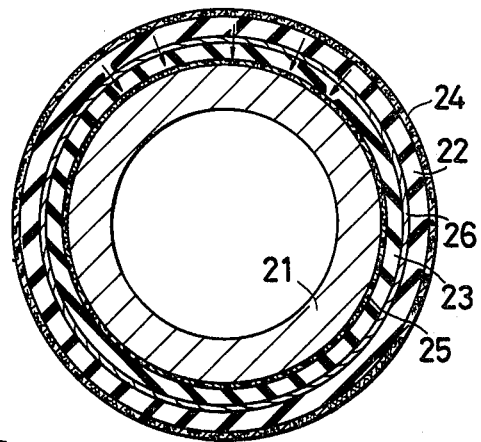
FIG. 4 is a sectional view of another conventional method of manufacturing a V-belt.
Figure 5:
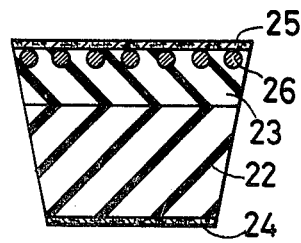
FIG. 5 is a sectional view of a V-belt manufactured according to the conventional method illustrated in FIG. 4.
Figure 6:
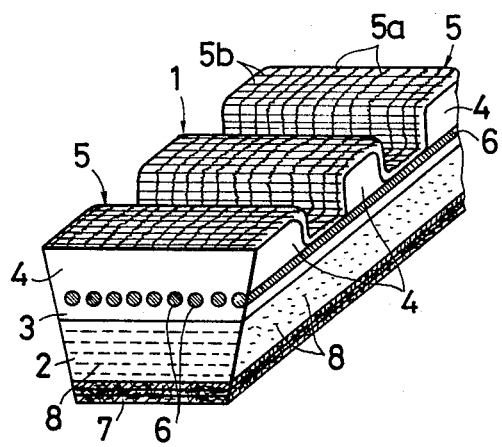
FIG. 6 is a perspective view showing a part of an adjustless V-belt according to this invention.
Figure 12:
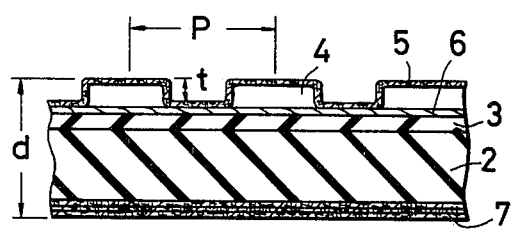
FIG. 12 is a cross-sectional view of the adjustless V-belt showing a pitch (p) of the cogs, depth (t) of the cogs, and thickness (d) of the V-belt.

Referring now to FIG. 6, a V-belt body 1 comprises: a compressive rubber layer 2 made of a heatproof synthetic rubber of CR rubber (polychloroprene rubber) or NBR rubber, or of a blend of these rubbers, or made of a coldproof rubber of a blend of NR (natural rubber) and SBR (styrene butadiene rubber) or of a blend of CR and BR (butyl rubber); and an adhesion rubber layer 3 laminated on the compressive rubber layer 2. The adhesion rubber layer 3 has a Shore hardness of 60° to 80° higher than that of an ordinary adhesion rubber layer to give lateral rigidity to the belt. A group of cogs 4 protrude from the surface of the adhesion rubber layer 3, extending in the direction of width of the belt. More specifically, the cogs 4 are provided at a predetermined pitch and with a predetermined depth (FIG. 12).

The pitch (p) and depth (t) of the cogs 4 are defined with respect to the thickness (d) of the belt as follows:

$$1.5\, t < p < 3.5\, t \quad \text{(A)}$$

$$0.12\, d < t < 0.4\, d \quad \text{(B)}$$

If, in expression (A), the pitch (p) of the cogs 4 is smaller than 1.5 t, then the configuration of the cog is elongated. As a result, the lateral rigidity is reduced and the cog may be broken and scattered during the run of the belt. If the cog pitch (p) is larger than 3.5 t, then in the case when a rope tensile member is wound on the protrusions of a metal mold to mold the belt, the section of the rope tensile member becomes polygonal. As a result the belt pitch line is pulsated on the pulley during the run of the belt, which results in vibration of the belt and the generation of heat. Thus, the pitch (p) should be within the above-described range (1.5 t<p<3.5 t).

In the case of expression (B), if the depth (t) of the cog 4 is smaller than 0.12 d, then the thickness of the cog is reduced, and therefore the reinforcement effect of the group of cogs for the rope tensile member is decreased. This results in a decrease of the service life of the belt. Furthermore, the belt itself is curved or deformed laterally to drop into the groove of the pulley. As a result stress is concentrated to the rope tensile members positioned both sides of the belt, which also results in a decrease of the service life of the belt.

If the depth (t) of the cog is larger than 0.4 d, necessarily the pitch line of the rope tensile member is lowered. Hence, the number of effective ropes and the effective power transmitting area are reduced, thus decreasing the power transmitting force of the belt. Thus, the depth (t) of the cog should be within the above-described range (0.12 d<t<0.4 d).

The cogs, and the roots between the cogs are covered with a sheet of cover canvas 5 which is stretchable only in the longitudinal direction of the belt. The canvas 5 is made frictional with a heatproof synthetic rubber or a coldproof rubber similar to the materials of the above-described rubber layers 2 and 3.

Figure 7:
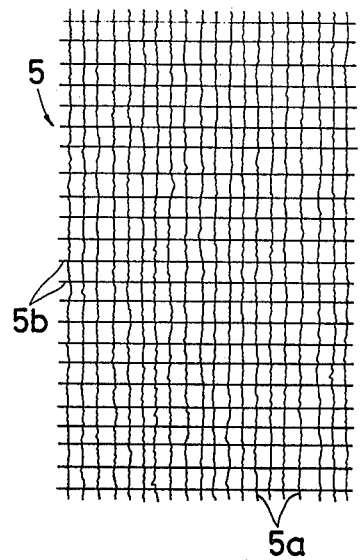
FIG. 7 is a plan view of a nylon cover canvas employed in the V-belt according to the invention.

One example of the cover canvas 5 is as shown in FIG. 7. The cover canvas 5 is obtained by weaving curled nylon warps 5a subjected to wooly treatment and ordinary nylon wefts 5b. The stretchable warps 5a are arranged in the longitudinal direction so that the belt can sufficiently bend in the longitudinal direction, while the ordinary nylon wefts 5b contribute to giving rigidity in the direction of width of the belt.

In FIG. 6, reference numeral 6 designates rope tensile members, the surfaces of which are subjected to adhesion treatment with an isocyanate group liquid and RFL liquid and are heat-set at 200° C. Thus, the rope tensile member has a thermal contraction stress of 0 g/denier at room temperature (20° C.) and 3.5 g/denier at 100° C. That is, the rope tensile member has such a great thermal contraction stress that the differential between a thermal contraction stress at 100° C. and that at 20° C. is $\Delta E_{100-20} = 3.5$ g/denier. More specifically, the rope tensile member is one which is made of polyester fibers or polyamide fibers meeting the above-described condition. The tensile members are embedded in spiral form between the adhesion rubber layer 3 and the group of cogs 4, with a regular pitch line, in such a manner that parts of the tensile members 6 are in contact with the cover canvas 5 at the roots of the group of cogs.

The differential $\Delta E_{100-20}$ between the thermal contraction stress at 100° C. and that at 20° C. of the rope tensile member 6 is one of the important aspects of the V-belt according to the invention. If a rope tensile member having the differential $\Delta E_{100-20}$ smaller than 3.5 g/denier is used, the thermal contraction stress cannot sufficiently act on the generation of heat during the run of the belt. Accordingly, the belt elongated by the heat is left as it is during the run, and therefore it is impossible to prevent the belt from slipping. Thus, the above-described value $\Delta E_{100-20}$ of the rope tensile member employed in the V-belt according to the invention must be larger than 3.5 g/denier.

The same material as that of the adhesion rubber layer 3 is employed for the compressive rubber layer 2. In general, a heatproof rubber is employed for the compressive rubber layer 2. However, if the heatproof rubber is used under cold environmental conditions of a temperature of −30° C. to −40° C., it may harden and deteriorate to the extent that the belt cannot be driven. In such a case, the above-described coldproof rubber may be employed for the compressive rubber layer 2. Furthermore, in view of the side pressure durability and the wear resistance of the belt, short fibers 8 are embedded laterally in the compressive rubber layer 2, in the ratio of 10 to 30 parts by weight of short fibers to 100 parts by weight of rubber. The short fibers are obtained by cutting natural fibers such as cotton threads, or synthetic fibers such as nylon, tetron, vinylon and rayon, or non-organic fibers such as glass fibers to 5–10 mm.

In FIG. 6, reference numeral 7 designates a rubberized canvas for the bottom, which is obtained by making a bias cotton canvas, in which warps form 90–150 degrees with wefts, frictional with CR or NBR. The number of plys of the rubberized canvas 7 is not limited to one (1); that is, it may be increased from two to five according to the operating conditions of the belt.

In order to improve the side pressure durability (rigidity) of the belt, a canvas obtained according to the following method may be bonded, in lamination, to the bottom surface of the belt. After the stretchable canvas 5 shown in FIG. 7 is subjected to adhesion treatment, one or both surfaces of the stretchable canvas are covered with a rubber having a predetermined thickness, similar in quality to that of the compressive rubber layer 2. Then, the canvas is bonded to the lower surface of the belt in such a manner that the curled nylon warps 5a are arranged in the longitudinal direction of the belt.

Furthermore, according to the operating conditions of the belt, a rubber sheet may be employed instead of the rubberized canvas 7, or the provision of the rubberized canvas 7 is unnecessary as the case may be.

The V-belt made according to the invention is as described above. The compressive rubber layer 2 and the adhesion rubber layer 3 forming the body of the V-belt are made of CR or NBR excellent in heat resistance, or a blend rubber such as NR-SBR or CR-BR in order to protect the belt from hardening and deterioration in cold areas. Therefore, the V-belt according to the invention can be most effectively employed for equipment such as automobiles in which heat is frequently generated as a result of the high speed operation of the belt. The service life of the belt is therefore increased.

The tensile member of the belt is made of a material such as polyester fibers or polyamide fibers excellent in thermal contraction characteristic. Accordingly, the tensile member can immediately contract in response to the heat generated in the belt when the belt is run at high speed and is repeatedly bent, or to the heat generated by friction due to the slip of the belt on the pulley. Thus, the tensile member automatically tightens the belt, and therefore it is unnecessary to manually adjust the tension of the belt.

The group of cogs having the predetermined pitch and depth protrude from the upper surface of the belt to improve the bending characteristic of the belt according to the invention. Although the cover canvas is bonded to the surface of the belt, the cover canvas does not affect the bending characteristic of the belt, because the cover canvas is sufficiently stretchable in the longitudinal direction of the belt. In the case of a power transmitting belt, especially a V-belt, the belt is liable to be depressed deeply into the groove of the pulley. As a result, the belt is curved greatly widthwise.

The provision of the cogs increases the widthwise rigidity of the belt. Since the entire upper surface of the belt including the cogs is covered with the cover canvas, the rigidity of the cogs is increased, which is effective significantly to suppress the widthwise deformation of the belt. The cogs and only one sheet of cover canvas prevent the deformation of the belt which may be caused by the side pressure applied thereto.

The rope tensile member wound spirally is embedded in the belt adhesion layer in such a manner that part of the rope tensile member is in contact with the cover canvas and the rope tensile member is arranged with a regular pitch line and in a cylindrical state. Therefore, the rope tensile member can expand and contract uniformly, the generation of the local fatigue of the belt is eliminated, and the belt can be used in a stable fashion.

The cover canvas is given a friction surface with the same material as that of the body of the belt. Therefore, the adhesion property of the cover canvas is markedly improved. Some parts of the rope tensile member are covered with the cover canvas, while some other parts of the rope tensile member are completely embedded below the group of cogs. The phenomenon of peeling the tensile member of the body of the belt is therefore effectively eliminated.

The adhesion rubber layer is higher in hardness and rigidity than the ordinary adhesion rubber layer, and the short fibers are embedded in the compressive rubber in such a manner that they are laterally orientated. Therefore, the V-belt according to the invention is excellent in both side pressure durability and wear resistance.

Now, a method of manufacturing the adjustless belt, utilizing a reversal molding method, which has the rope tensile member according to the invention, will be described with reference to FIGS. 8 to 11.

Figure 8:
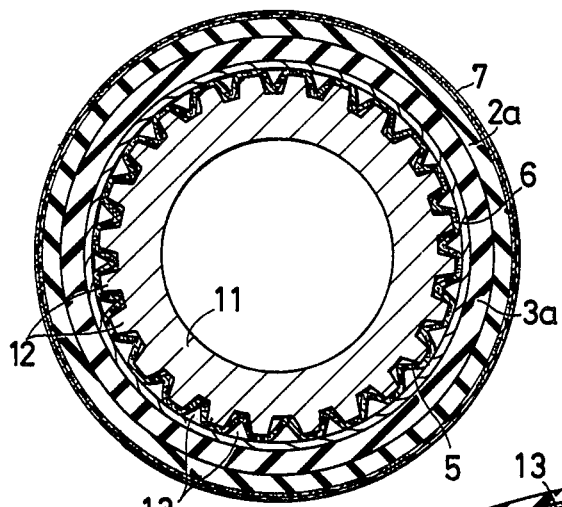
FIG. 8 is a sectional view of the adjustless V-belt according to the invention.
Figure 9:
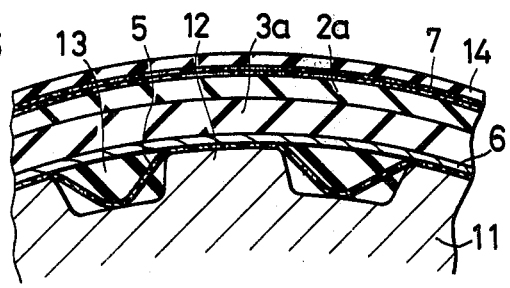
FIGS. 9 through 11 are sectional views showing the steps of vulcanization employed in the method of manufacturing the adjustless V-belt according to the invention.

Referring to FIG. 8, strip-shaped protrusions 12 and grooves 13 are alternately formed on the outer wall of a cylindrical metal mold 11 in such a manner that the protrusions 12 and the grooves are extended in parallel with the axis of the cylindrical metal mold 11. The above-described cover canvas 5 is wound around the metal mold in such a manner that the curled warps 5a are arranged in the longitudinal circumferential direction of the metal mold 11. The cover canvas 5 is obtained according to the above-described method in which a canvas is prepared by weaving the curled nylon warps 5a subjected to wooly treatment and the ordinary nylon wefts 5b as shown in FIG. 7. After being subjected to adhesion treatment, the canvas is made frictional with a blend rubber such as NR-SBR or CR-BR, so that it is stretchable only in one direction. The cover canvas 5 is wound on the metal mold with slack so that it follows the groove 13 of the metal mold as shown in FIG. 9.

Figure 10:
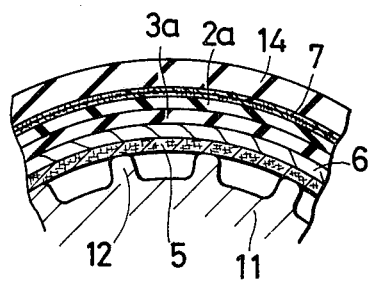

In the case where a canvas high in stretchability is used as the cover canvas, it is unnecessary to provide slack to permit the cover canvas to follow the grooves 13. That is, the cover canvas 5 and the tensile member 6 may be laid as shown in FIG. 10.

Figure 13:
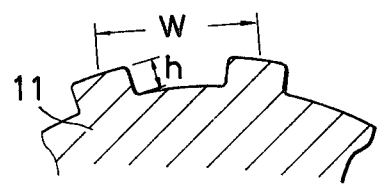
FIG. 13 is a partial cross-sectional view of the metal mold showing a pitch (w) of protrusions and height (h) thereof.

Since the configuration of the metal mold 11 corelates to the pitch and depth of the above-described group of cogs 4 of the belt, the pitch (w) and height (h) of the protrusions 12 of the metal mold 11 are defined with respect to the thickness (d) of the belt as follows (see FIGS. 12 and 13):

$$1.5h < w < 3.5h$$

$$0.12d < h < 0.4d$$

Then, polyester fiber rope tensile member 0.6–2.5 mm in diameter, the surface of which is subjected to adhesion treatment with isocyanate group liquid and RFL liquid and is heat-set to have a great thermal contraction stress which is such that the differential $\Delta E_{100\text{-}20}$ between a thermal contraction stress at 100° C. and that at 20° C. is larger than 3.5 g/denier, is spirally wound on the cover canvas with a tension 1.5 to 3.5 times the ordinary tension (0.2–0.6 g/denier). The thermal contraction stress is therefore effectuated when heat is generated in the belt.

Thereafter, an adhesion rubber sheet 3a not yet vulcanized, which is made of a heatproof synthetic rubber which is of CR or NBR or which is obtained by blending these rubbers; or a coldproof rubber such as a blend of NR-SBR or CR-BR, is wound on and bonded to the tensile member 6. The amount of the adhesion rubber sheet 3a must be such that while the cogs 4 of the belt 1 are formed the entire lower surface of the tensile member 6 is covered.

Then, a compressive rubber sheet 2a made of a heatproof synthetic rubber of a coldproof rubber similar to the material of the adhesion rubber sheet 3a is wound on the adhesion rubber sheet 3a. Since the compressive rubber sheet forms an essential part of the rubber of the belt, the thickness of the compressive rubber sheet 2a is larger than that of the adhesion rubber sheet 3a. In order to improve the side pressure durability and the wear resistance of the belt, a rubber sheet obtained according to the following method may be used as the compressive rubber sheet 2a. Various short fibers of 10–30 parts by weight are mixed in rubber of 100 parts by weight in such a manner that the short fibers are orientated laterally therein, to form a rubber sheet, which is subjected to sheeting by a calendar or the like. The rubber sheet thus formed may be used the compressive rubber sheet.

Finally, two to five plys of bias rubberized cotton canvas which is made frictional with CR, or NBR, or an NR-SBR or CR-BR blend rubber are wound on the compressive rubber sheet. Alternatively, two to five plys of stretchable canvas 7 obtained by weaving the curled nylon warps 5a as shown in FIG. 7 are wound of the compressive rubber sheet, to form a molded belt blank.

Figure 11:
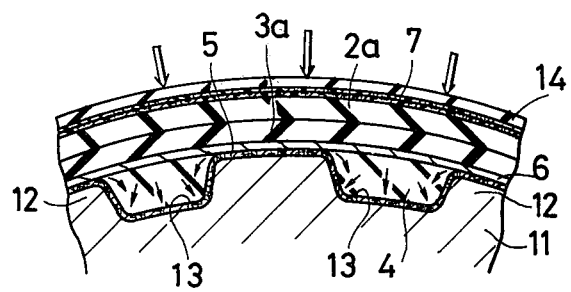

The molded belt blank thus formed is vulcanized in a vulcanizing process as illustrated in FIGS. 9 through 11. As shown in FIG. 9, the stretchable cover canvas 5 is wound on the metal mold 11 in such a manner that it follows the grooves 13 of the metal mold 11 and triangular gaps are formed between the tensile member 6 and the canvas 5. However, as described before, in the case where a canvas high in stretchability is used, it is unnecessary to form the triangular gaps; that is, the canvas 5 and the tensile member 6 may be laid as shown in FIG. 10.

Then a cylindrical rubber jacket 14 is placed over the molded belt blank. The molded belt blank together with the rubber jacket 14 is placed in a vulcanizing furnace, and is vulcanized by steam introduced, under a pressure of 7 to 8 kg/cm², into the vulcanizing furnace. In this operation, the jacket 14 is heated and pressurized in the directions of the arrows (FIG. 11) by the steam at a high temperature and a high pressure. Therefore, the internal rubber sheets 3a and 2a not yet vulcanized become fluidized. The adhesion rubber sheet 3a in direction contact with the tensile member 6 especially flows into the grooves 13 of the metal mold as indicated by the arrows through the gaps between the parts of the tensile member 6, while inflating the stretchable cover canvas 5, thereby to form the cogs 4 of the belt.

The amount of rubber flowing between the parts of the tensile member 6 is much greater than that in the ordinary molding method illustrated in FIGS. 1 through 5. Furthermore, the rubber flowing between the parts of the tensile member is higher in viscosity than a polyurethane rubber in the case of a liquid polyurethane injection molding method, and therefore it is in a turbulant state as a kind of mixed rubber. As a result, the surface of the adhesion rubber sheet 3a and the surface of the tensile member 6 are activated, and the adhesion forces of the tensile member 6, adhesion rubber layer 3 and cogs 4 forming the body of the belt are significantly improved.

In the method of manufacturing the belt according to the invention, the tensile member 6 having at least $\Delta E_{100\text{-}20}=3.5$ g/denier is wound, with a tension 1.5 to 3.5 times the ordinary tension, directly on the nylon cover canvas wound on the metal mold 11, and therefore the tensile member 6 will not drop into the rubber layer, and the tensile member 6 is arranged, in cylindrical state, with a regular pitch line.

After vulcanization, the jacket 14 is removed, and then the molded belt blank is removed from the metal mold 11 after being cooled down. The molded belt blank is cut, in a well known manner, into a plurality of rings having a predetermined width, and the rings are turned inside out to form the V-belts as shown in FIG. 6.

Test results of the V-belt according to the invention will be described with reference to a comparative example.

COMPARATIVE EXAMPLE

The V-belt obtained according to the belt manufacturing method of the invention and the V-belt obtained according to the conventional belt manufacturing method (illustrated in FIG. 1) were subjected to a running test. Both of the V-belts included polyester fiber tensile members equal in diameter. As a result of the running test, it was found that the tension of the V-belt obtained according to the conventional belt manufacturing method was significantly reduced and it was necessary to adjust the tension of the V-belt after the run of approximately 40,000 km. The reason for this resides was that the rope tensile member dropped in the adhesion rubber layer by the thermal contraction caused during the belt vulcanization. As a result the rope tensile member was loosened; that is, the thermal contraction stress of of the tensile member was reduced, and at worst the arrangement of the tensile member would be made irregular. When the tensile member is loosened and a sufficient thermal contraction stress is not obtained during the run of the belt, then the tension of the belt is reduced and it is necessary to frequently adjust the tension of the belt. In the case where the arrangement of the tensile member becomes irregular, the tensile member cannot bear stress uniformly, and therefore the belt will be quickly broken.

On the other hand, the tension of the V-belt built according to the invention was not noticeably reduced even after the running test, and was maintained at a level higher than the threshold level at which the belt might slip. Thus, the durability of the V-belt according to the invention was more than two times that of the conventional V-belt.

Thus, it can be shown that in the V-belt according to the invention, the rope tensile member is regularly arranged on the pitch line, and when heat is generated in the belt by the slip of the belt during the run, the rope tensile members cause uniform thermal contraction to automatically maintain the tension of the belt unchanged.

As is apparent from the above description, in the method of manufacturing a V-belt according to the invention utilizing the reversal molding method, the rope tensile member having a thermal contraction characteristic of at least $\Delta E_{100\text{-}20}=3.5$ g/denier is wound directly on the thin nylon cover canvas excellent in stretchability which has been wound on the hard metal mold having the strip-shaped protrusions on the outer wall. Therefore, in the method according to the invention, unlike the conventional method, the phenomenon of dropping the tensile member in the rubber layer by the thermal contraction caused during the vulcanization never occurs, and the tensile members are regularly arranged on the pitch line.

In the case when heat is generated in the belt by its slip during the run, all of the tensile members cause uniform thermal contractions, to contract the belt itself. Accordingly, unlike the conventional belt, it is unnecessary to provide a tension pulley and to adjust the distance between the pulleys, in order to maintain the tension of the belt unchanged; that is, the belt according to the invention can be driven with a constant tension at all times. Thus, the service life of the belt is increased.

Furthermore, in molding the belt, a rubber not vulcanized yet and high in viscosity is permitted to flow, in a turbulant state, between the tensile members, and therefore the surfaces of the tensile members are activated. In addition, since the rubber layer constituted by the group of cogs is interposed between the upper nylon cover canvas and the tensile members, no peeling phenomenon occurs, unlike the conventional belt, and the adhesion property is improved.

It is apparent that modifications of this invention can be made without departing from the essential scope thereof.

What is claimed is:

1. A V-belt comprising:
   a compressive rubber layer;
   an adhesion rubber layer laminated on said compressive rubber layer having a Shore hardness of from 60° to 80°;
   a group of cogs protruding from said adhesion rubber layer on the outer surface of said belt having a predetermined pitch and depth defined by;

$1.5t < p < 3.5t$ $0.12d < t < 0.4d$ where, p is the pitch of said group of cogs, t is the depth of said group of cogs, and d is the thickness of said V-belt;
   a longitudinally stretchable cover canvas covering said cogs, and the roots between said cogs, said cover canvas obtained by weaving curled nylon warps subjected to wooly treatment and ordinary nylon wefts;

rope tensile members embedded between said adhesion rubber layer and said group of cogs with a regular pitch line and in cylindrical state such a manner that parts of said tensile members are in contact with said cover canvas, said rope tensile members having a high thermal contraction stress at least 3.5 g/denier, which is the differential between a thermal contraction stress at 100° C. and that at 20° C.;

short fibers embedded in said compressive rubber layer in such a manner that said short fibers are oriented laterally therein and in the ratio of 10 to 30 parts by weight of short fibers to 100 parts of rubber; and a ply of rubberized canvas bonded, in lamination, to the lower surface of said compressive rubber layer.

2. The belt of claim 1 wherein said rubber layer is a heatproof rubber.

3. The belt of claim 1 wherein said rubber layer is a coldproof rubber.

4. A V-belt as claimed in claim 1, wherein said rope tensile members having a high thermal contraction stress are made of polyester fibers.

5. A V-belt as claimed in claim 1, wherein said rope tensile members having a great thermal contraction stress are made of polyamide fibers.

6. A V-belt as claimed in claim 1, wherein said adhesion rubber layer is made of CR (polychloroprene rubber).

7. A V-belt as claimed in claim 1, wherein said adhesion rubber layer is made of NBR.

8. A V-belt as claimed in claim 1, wherein said adhesion rubber layer is made of a blend of CR and NBR.

9. A V-belt as claimed in claim 1, wherein said adhesion rubber layer is made of a blend of NR (natural rubber) and SBR (styrene butadiene rubber).

10. A V-belt as claimed in claim 1, wherein said adhesion rubber layer is made of a blend of CR and BR (butyl rubber).

11. A V-belt as claimed in claims 1, 2 or 3, wherein said compressive rubber layer is made of CR.

12. A V-belt as claimed in claims 1, 2 or 3, wherein said compressive rubber layer is made of NBR.

13. A V-belt as claimed in claims 1, 2 or 3, wherein said compressive rubber layer is made of a blend of CR and NBR.

14. A V-belt as claimed in claims 1, 2 or 3, wherein said compressive rubber layer is made of a blend of NR and SBR.

15. A V-belt as claimed in claims 1, 2 or 3, wherein said compressive rubber layer is made of a blend of CR and BR.

16. A V-belt as claimed in claim 1, wherein said rubberized canvas bonded, in lamination, to the lower surface of said compressive rubber layer is a bias canvas.

17. A V-belt as claimed in claim 1, wherein said rubberized canvas bonded, in lamination, to the lower surface of said compressive rubber layer is a stretchable canvas obtained by weaving curled nylon warps subjected to wooly treatment and ordinary nylon wefts.

18. A method of manufacturing an adjustless V-belt, comprising the steps of:

winding a cover canvas which is longitudinally stretchable around a metal mold having an outer wall with strip-shaped protrusions and grooves are alternately formed in such a manner that said protrusions and grooves extend along the axis of said metal mold defined by;

$$1.5h < w < 3.5h$$

$$0.12d < h < 0.4d$$

where w is the pitch of said protrusions, h is the height of said protrusion, and d is the thickness of said V-belt;

spirally winding a rope tensile member around said cover canvas at a winding tension of 1.5 to 3.5 times the ordinary tension which is 0.2 to 0.6 g/denier, said rope tensile member subjected to thermal elongation treatment and having a high thermal contraction stress of at least 3.5 g/denier which is the differential between a thermal contraction stress at 100° C. and that at 20° C.;

winding an adhesion rubber sheet on said rope tensile member;

winding a compressive rubber sheet in which short fibers are mixed in such a manner that the short fibers are oriented laterally therein, on said adhesion rubber sheet;

winding at least one ply of rubberized canvas onto said compressive rubber sheet, to form a molded belt blank;

placing a cylindrical sleeve over said molded belt blank;

pressurizing and heating said molded belt blank together with said cylindrical sleeve, to permit a part of said adhesion rubber sheet to fill the grooves of said metal mold;

cutting the molded belt blank into a plurality of belt rings; and turning said belt rings inside out to form said V-belt.

19. A method as claimed in claim 18, wherein said rubberized canvas comprises a bias canvas.

20. A method as claimed in claim 18, wherein said rubberized canvas comprises a stretchable canvas.

* * * * *